United States Patent [19]

Leitner et al.

[11] 4,327,200

[45] Apr. 27, 1982

[54] WATER-DILUTABLE OXAZOLIDINE GROUP CONTAINING EPOXY RESIN ESTERS, COATING COMPOSITIONS PREPARED THEREFROM, AND THEIR USE AS CATHODICALLY DEPOSITABLE PAINTS

[75] Inventors: Wolfgang Leitner; Georg Pampouchidis; Anton Bleikolm, all of Graz, Austria

[73] Assignee: Vianova Kunstharz, A.G., Werndorf, Austria

[21] Appl. No.: 201,968

[22] Filed: Oct. 29, 1980

[30] Foreign Application Priority Data

Nov. 5, 1979 [AT] Austria ............................ 7082/79
Apr. 25, 1980 [AT] Austria ............................ 2224/80
Apr. 25, 1980 [AT] Austria ............................ 2225/80

[51] Int. Cl.$^3$ .................... C08L 61/32; C08G 59/58; C08G 63/68
[52] U.S. Cl. .................... 525/531; 525/530; 528/114; 528/365; 523/418
[58] Field of Search ............... 260/29.2 EP; 525/530, 525/531, 504; 528/114, 365

[56] References Cited

U.S. PATENT DOCUMENTS

2,951,058 8/1960 Updegraff et al. .................. 525/504
3,994,916 11/1976 Jurisch ........................ 260/29.2 EP

*Primary Examiner*—Paul Lieberman
*Assistant Examiner*—Robert Sellers
*Attorney, Agent, or Firm*—A. W. Breiner

[57] ABSTRACT

Binders water-dilutable upon neutralization with inorganic and/or organic acids comprising the reaction product of (A) resins having at least 2 1,2-epoxy groups per molecule and an epoxy equivalent of at least 160; and (B) a semiester of a dicarboxylic acid and an N-2-hydroxyalkyloxazolidine, and a process for the formation of the binders, is described. The binders have sufficient basic groups for neutralization with acids to provide water dilutability, as well as the functional groups required for crosslinking of the binders. The binders upon stoving provide films with good resistance characteristics and have reduced losses.

24 Claims, No Drawings

WATER-DILUTABLE OXAZOLIDINE GROUP CONTAINING EPOXY RESIN ESTERS, COATING COMPOSITIONS PREPARED THEREFROM, AND THEIR USE AS CATHODICALLY DEPOSITABLE PAINTS

This invention is directed to water-dilutable paint binders. More particularly, this invention is concerned with water-dilutable oxazolidine group containing epoxy resin esters and to a process for producing said esters which are particularly suitable for the formulation of cathodically depositable coating compositions.

U.S. Pat. No. 4,174,332 and co-pending applications Ser. No. 816,936 filed July 19, 1977, now U.S. Pat. No. 4,238,594; Ser. No. 860,131 filed Dec. 13, 1977, and Ser. No. 860,145 filed Dec. 13, 1977, disclose the introduction of the basic groups into hydroxy group carrying polymer molecules which are necessary for their cathodic deposition through intermediates carrying one free isocyanate group and at least one basic nitrogen group. The monoisocyanate compounds, according to the aforesaid patent and applications, are prepared by reacting di- or polyisocyanates with a corresponding quantity of dialkylalkanolamines. Upon stoving of the electrophoretically deposited film based on the aforesaid polymers, the aforementioned amines are split off to a certain extent with consequent losses which have to be eliminated from the exhaust air of the stoving equipment.

The same or similar problem is observed with products described, for example, in German Offenlegungsschrift No. 20 57 799 or German Auslegeschrift Nos. 22 52 536 and 22 65,195, where cathodically deposited coating compositions are crosslinked through urethane formation after splitting off the masking agent from blocked isocyanates.

British Patent Specification No. 1,391,922 discloses the reaction products of epoxy resins with reaction products of tertiary hydroxy amines and dicarboxylic acid anhydrides. With these products it is necessary that a part of the epoxy groups remain intact during the reaction in order that the products contain crosslinkable groups. As is known, these groups have only a very short stability in an aqueous solution such as an electrodeposition bath, which means that such bath tanks become unusable within short periods if time, particularly in the presence of the necessary catalysts.

It is an object of the present invention to provide binders for cathodic electrodeposition which have good resistance characteristics, particularly those required by the automobile industry and, furthermore, which have reduced losses on stoving and which require lower stoving temperatures to obtain sufficient crosslinking for good film characteristics.

It has now been found that the aforesaid requirements can be fulfilled if N-2-hyroxyalkyloxazolidine semiesters of dicarboxylic anhydrides are used for introducing the basic groups into epoxy group containing polymer molecules as required for water dilutability.

The present invention, therefore, is concerned with a process for producing binders water-dilutable upon partial or total neutralization with inorganic and/or organic acids, based on epoxy resin esters, characterized in that the epoxy groups of a resinlike compound with at least 2 1,2-epoxy groups per molecule and an epoxy equivalent of at least 160 are reacted completely at 60°–75° C., in the presence of inert solvents, with a semiester of an aliphatic, cycloaliphatic, or aromatic dicarboxylic acid and an N-2-hydroxyalkyloxazolidine having the general formula—

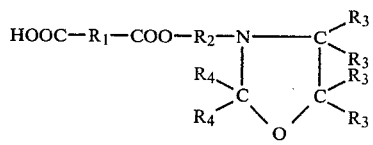

wherein
$R_1$ is a saturated or unsaturated aliphatic, cycloaliphatic, or aromatic hydrocarbon radical,
$R_2$ is a straight chain or branched alkylene radical,
$R_3$ is a hydrogen atom or an alkyl radical, and
$R_4$ is a hydrogen atom or an alkyl radical with up to 6 carbon atoms.

Optionally other compounds which will introduce additional crosslinking functional groups and/or other functional groups influencing film formation and/or film surface can be added, the quantity of oxazolidine semiesters being chosen in order that the epoxy-free final product has a theroetical amine number of at least 35, preferably 50 to 140, mg KOH/g. The aforesaid oxazolidine semiesters introduce into the polymer, in one step, the basic group necessary for neutralization as well as the groups necessary for a crosslinking of the film. Accordingly, it is not necessary to maintain a part of the epoxy group in the unreacted state, but, via these epoxy groups, other stable crosslinking functions and/or functions governing film formation or film surface may be introduced.

Surprisingly, it has also been found that resins exclusively or partially rendered soluble by means of N-2-hydroxyalkyloxazolidines, with a low degree of neutralization, show good solubility in water. Another advantage over the binders of the prior art is the ability to reduce the stoving temperature and/or stoving time, since the binders of the invention crosslink at temperatures as low as 130° C. Optimum resistance characteristics in the films are obtained with stoving schedules of 10–30 minutes at 140°–180° C. The low losses of the binders on stoving are particularly advantageous. After 30 minutes at 180° C. losses are below 7% (calculated on the film cured at 100° C.). The stoved films exhibit excellent solvent resistance and superior corrosion resistance.

It is theorized that the surprising effects as above noted are produced because the oxazolidine ring opens in the acid medium with the action of water, the following reactions believed to occur:

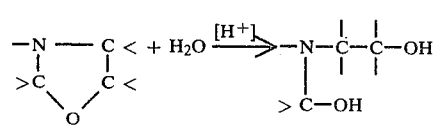

From the results obtained with the products of the invention, it appears justified to assume that the advantageous characteristics are due to the reactivity of the optionally substituted N-methylol groups. Furthermore, the hydroxy groups which are formed support the water solubility of the resins which in turn permits a reduction in the quantity of acid necessary for obtaining water dilutability. On curing, a part of these hydroxy groups is consumed. Thus, water resistance of the cured film is not adversely influenced as a result of the resin being hydrophilic in nature.

The preparation of the N-2-hydroxyalkyloxazolidine is accomplished in known manner by reacting dialkanolamines and aldehydes or ketones at temperatures of up to 130° C. as a maximum, splitting off water in the reaction. The dialkanolamines preferably are diethanolamine and diisopropanolamine. Optionally dialkanolamines with longer alkyl radicals can be used. A suitable carbonyl component preferably is formaldehyde, but higher aldehydes or ketones with up to 6 carbon atoms in the alkyl radical can be employed.

The semiesters used for reaction of the epoxy groups of the basic polymer have the general formula as follows:

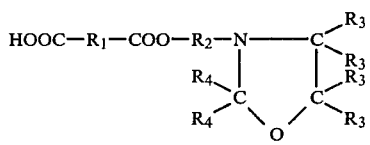

wherein
$R_1$ is a saturated or unsaturated aliphatic, cycloaliphatic, or aromatic hydrocarbon radical,
$R_2$ is a straight chain or branched alkylene radical,
$R_3$ is a hydrogen atom or an alkyl radical, and
$R_4$ is a hydrogen atom or an alkyl radical with up to 6 carbon atoms.

The preparation of these semiesters is accomplished in simple manner by reacting N-2-hydroxyalkyloxazolidines with cyclic dicarboxylic acid anhydrides. Suitable cyclic dicarboxylic acid anhydrides include the anhydrides of aromatic dicarboxylic acids, such as o-phthalic anhydride or naphthalene dicarboxylic acid anhydride. Alicyclic dicarboxylic acids which form suitable anhydrides include tetrahydrophthalic or hexahydrophthalic acid, the endoalkylene tetrahydrophthalic acids, halogen substituted phthalic acids, and analogous derivatives of other aromatic dicarboxylic acids. Suitable aliphatic dicarboxylic acid anhydrides include succinic acid and its homologues forming cyclic anhydrides. Suitable unsaturated aliphatic dicarboxylic acids include maleic acid and its halogen substituted products.

The reaction of the oxazolidine with the dicarboxylic acid anhydride is effected, in stoichiometric weight ratios, preferably in the presence of inert solvents, such as esters, ethers, ketones, or aromatic solvents. The basic groups accelerate the reaction which occurs quickly, even at low temperatures without catalyst. At temperatures of between 40° and 80° C., normally after 30 to 120 minutes, the theoretical acid value of the semiester is attained. Temperatures above 80° C. should not be employed in the preparation of the semiester, since in such case crosslinking reactions may take place, leading to unusable intermediates.

The N-2-hydroxyalkyloxazolidine dicarboxylic acid semiesters are reacted at from 60° to 75° C. with the 1,2-epoxy group containing compounds. Suitable compounds for use herein are the known epoxy resins based on the phenols, particularly of Bis-phenol A and phenolic novolaks, as well as epoxy resins based on aliphatic alcohols and copolymers carrying glycidyl groups, with an epoxy equivalent of at least 160. In order to ensure efficient functionality, the epoxy compounds must have at least 2 1,2-epoxy groups in the molecule. Suitable epoxy compounds are described in detail in "Handbook Of Epoxy Resins," H. Lee and K. Neville, McGraw-Hill Book Company, New York, 1967.

The weight ratios of the components are chosen in order that a theoretical amine number of at least 35, preferably of between 50 to 150, mg KOH/g will result in the final products. In most cases, in this reaction, not all of the epoxy groups are consumed, thus providing a basis for modification, whereby the properties of the binders can be adjusted within a wide range to the needs of practice. The modifications listed below can either be executed singly or in conjunction to modify the oxazolidine group containing epoxy resins esters:

(1) The epoxy groups not consumed in the reaction for introducing the oxazolidine semiester can be reacted with saturated and/or unsaturated carboxylic acids.

While the longer chain monocarboxylic acids, as known to those skilled in the art, influence the properties of the products, alpha,beta-ethylenically unsaturated acids enhance the crosslinking tendency of the resins through additional thermic polymerization. The use of unsaturated acids is recommended especially for resins which are to be processed to give coating compositions for cure at 160° C. and above. Suitable alpha,-beta-ethylenically unsaturated monocarboxylic acids are acrylic acid, methacrylic acid, or corresponding semiesters of dicarboxylic acids and hydroxy(meth)acrylates. Suitable longer chain monocarboxylic acids include the saturated or unsaturated oil fatty acids.

If a semiester of a dicarboxylic acid and a hydroxyalkyl(meth)acrylate is used as the monocarboxylic acid, this semiester can be produced simultaneously together with the oxazolidine semiester in the same reactor. This method is of particular advantage since, as a result of the basic character of the oxazolidine, the reaction between acid anhydride and hydroxyalkyl(meth)acrylate is catalyzed, which means that at low temperatures, i.e., 40°-80° C., total conversion is attained within a short period of time.

When using dicarboxylic acids such as succinic acid and its homologues, maleic acid, phthalic acids, and the like, an additional crosslinking of the epoxy resins is obtained to form units with a higher molecular weight; this, in turn, exerts a favorable effect on the properties of the resin and thus on the coating compositions prepared therefrom. Furthermore, in epoxy resin blends, these components cause a homogenization of the various epoxy resins used and thus also lead to an improvement in the resin characteristics. Optionally, monocarboxylic acids can also be used. When using dicarboxylic acids, small amounts of monoepoxy compounds can be used to regulate the viscosity.

(2) A further modification possible is the reaction of the epoxy groups which remain free after the reaction with the oxazolidine semiester with primary and/or secondary amines.

If the oxazolidine semiesters are used solely as the basic binder component in cathodically depositable paints, the low basicity of the oxazolidine group has a disadvantageous effect. The resins, although being water-soluble with a low degree of neutralization, provide solutions having a low pH-value (of below 6, often below 5). The consumers often believe that this is a disadvantage since a low pH-value is alleged to be the reason for corrosion of metal coating equipment coming into contact with the resin solution. This disadvantage can be overcome through the proportional introduction of semiesters of dicarboxylic acids and tertiary amine alcohols without sacrificing the advantages gained through the oxazolidine groups. The modification is essentially characterized in that from 30 to 99.5, preferably from 40 to 60, mole percent of the epoxy groups are reacted with an oxazolidine semiester; from 0.5 to 70, preferably 5 to 35, mole percent with a primary and/or secondary amine, and any remaining epoxy groups are reacted with saturated and/or unsaturated carboxylic acids.

One preferred embodiment lies in the use of primary amines, more particularly in combination with secondary amines or in the form of primary-tertiary amines. The primary amine group can react with 2 1,2-epoxy groups, a linking of two epoxy resin molecules resulting. Since the nitrogen grouping emanating from this reaction is of low basicity, in order to raise the pH-value of the aqueous resin solution either a secondary amine is added, or a primary-tertiary amine is used in place of the primary amine. Thereby, the primary amine group serves to link the epoxy resin molecules, while the tertiary amine group, not reactive with the epoxy groups, forms the strongly basic component. The use of primary amines, particularly when employing blends of various epoxy compounds, is advantageous since the bifunctional amine causes a certain homogenization of the heterogeneous blend. When using primary amines, minor quantities of monoepoxy compounds can be used to regulate the viscosity. When using secondary amines, monofunctional with regard to epoxy groups, no substantial rise in viscosity is observed; one amine molecule reacting with one epoxy group. In general, it is sufficient to react a relatively small part of the epoxy groups present with the amine, in order to raise the pH-value of the aqueous solution by from 1 to 1.5 units. Provided the portion of the epoxy groups reacted with the oxazolidine semiester is not below 30 mole percent, a portion of from 0.5 to 70 mole percent can be reacted with the amine. Preferably, the portion of oxazolidine semiester is from 40 to 50 mole percent, the portion of amine of from 5 to 35 mole percent, calculated on the epoxy groups being available.

Suitable primary amines are monoalkyl amines of the type $R-NH_2$, wherein R is an aliphatic, cycloaliphatic, or aromatic radical, which may also contain functional groups which are inert to epoxy groups, such as tertiary amine groups. Examples of suitable primary amines are monoalkylamines, such as monoethylamine, monopropylamine, monobutylamine, and their longer chain homologues and isomers; monocycloalkylamines, such as cyclohexylamine; aromatic monoamines, such as aniline and its homologues. Preferred primary amines, carrying a tertiary amine group in addition, include the N-N-dialkylaminoalkylamines, such as dimethylaminopropylamine, diethylaminopropylamine, diethylaminobutylamine, and the like. Suitable secondary amines are of the $R_1-NH-R_2$ type, $R_1$ and $R_2$ possibly being linked to 5-membered or 5-membered rings. Examples are the corresponding dialkylamines, such as diethyalmine, dipropylamine dibutylamine, and the like, or morpholine.

The amines can be reacted with the epoxy compound either subsequent to the reaction with the oxazolidine semiesters and carboxylic acids or simultaneously with them. The sum of amine and acid equivalents should substantially correspond to the number of epoxy equivalents of the epoxy compound used, in order to obtain a final product free of epoxy groups. For attaining satisfactory water solubility, the products should, as already mentioned, have an amine number of at least 35, preferably between 50 and 140, mg KOH/g.

(3) An additional modification for increasing the basicity of the oxazolidine group containing binders is the proportional introduction of semiesters of dicarboxylic acids and tertiary amine alcohols in a quantity selected so as not to sacrifice the advantages gained through the presence of the oxazolidine groups.

This modification is substantially characterized in that from 30 to 99, preferably from 40 to 70, mole percent of the epoxy groups are reacted with an oxazolidine semiester; from 1 to 30, preferably 5 to 15, mole percent with a semiester of a dicarboxylic acid and a tertiary amine alcohol, and any remaining epoxy groups are reacted with saturated and/or unsaturated carboxylic acids. Through the coemployment according to the invention of strongly basic semiesters of dicarboxylic acids and tertiary amine alcohols, the pH-value of the aqueous resin solution is raised into a favorable range. Since, however, the excellent solubility characteristics imparted by the oxazolidine semiesters are adversely influenced by the coemployment of the basic semiesters, only from 1 to 30 mole percent, preferably 5 to 15 mole percent, of the epoxy groups are reacted with this component. With higher quantities, the degree of neutralization necessary for obtaining solubility in water has to be increased, which, in turn, leads to an adverse influence on the characteristics of the material. The portion of oxazolidine semiester thus lies between 30 to 99 mole percent, calculated on the epoxy groups.

These basic semiesters are produced in known manner by reacting the anhydrides of aliphatic, cycloaliphatic, or aromatic dicarboxylic acids with tertiary amine alcohols, preferably in the presence of inert solvents, at from 60° to 90° C. The preferred dicarboxylic acid components are the anhydides of cyclic dicarboxylic acids, such as o-phthalic anhydride and the partially or totally hydrate or substituted derivatives thereof. Suitable tertiary amine alcohols include dimethyl-, diethyl-, dipropyl-, dibutylaino ethanols and the corresponding propanols and butanols. A preferred embodiment of this type of modification is the combination of oxazolidine semiesters, basic semiesters, and dicarboxylic acids as esterification components for the epoxy groups of the resinlike compound.

If, as the modifying monocarboxylic acid, a semiester of a dicarboxylic acid and a hydroxyalkyl(meth)acrylate is used, this semiester may be produced in one step, simultaneously with the oxazolidine semiester and the basic semiester. This method is of particular advantage since as a result of the basic character of the oxazolidine, the reaction between acid anhydride and hydroxyalkyl(meth)acrylate is catalyzed whereby at low temperatures, i.e., 40° to 80° C., conversion is practically complete within a short period of time.

The binders can be ground in known manner with pigments and, for preparing a finished ready-to-use material, are partially or totally neutralized with inorganic or organic acids to a pH-value of from 4 to 7 and diluted with preferably deionized water for use in electrodeposition to a solids content of between 5 and 20 percent. The binders prepared according to the invention, also with low degree of neutralization, show excellent dilutability with water. The use of additives and auxiliary material and the conditions for coating of a substrate wired as the cathode are those known to those skilled in the art.

The following examples illustrate the invention without limiting its scope. Parts and percentages are by weight, unless otherwise stated.

The following abbreviations are used in the examples:

| | |
|---|---|
| THPA | tetrahydrophthalic acid anhydride |
| PA | o-phthalic acid anhydride |
| MA | maleic acid anhydride |
| HETOX | N-2-hydroxyethyloxazolidine |
| HIPOX | N-2-hydroxypropyl-5-methyl-oxazolidine |
| MIBK | methylisobutylketone |
| AEGLAC | ethyleneglycolmonoethylether acetate |
| AEGL | ethyleneglycolmonoethylether |
| EPH | epoxy compound |
| | I: epoxy resin based on Bisphenol A having an epoxy equivalent of about 200, |
| | II: epoxy resin based on Bisphenol A having an epoxy equivalent of about 550, |
| | III: epoxy resin based on an epoxidized phenol novolak having an epoxy equivalent of about 200. |
| OSE | oxazolidine semiester |
| BSE | basic semiesters |
| MCA | monocarboxylic acid |
| | S 1 : methacrylic acid |
| | S 2 : acrylic acid |
| | S 3 : semiester of THPA and hydroxyethyl-methacrylate |
| | S 4 : semiester of THPA and hydroxyethyl-acrylate |
| | S 5 : semiester of PA and hydroxyethyl-methacrylate |
| | S 6 : tall oil fatty acid |
| DCA | dicarboxylic acid |
| | S 9 : adipic acid |
| | S 10: terephthalic acid |
| | S 11: succinic acid |
| BA | butyl amine |
| DMAPA | dimethylaminopropylamine |
| DEAPA | diethylaminopropylamine |
| DEA | diethylamine |
| DBA | dibutylamine |
| ES | acetic acid |
| AS | formic acid |
| DBN | double bond number = number of moles of chain end double bonds in 1000 g of resin solids |
| AN | amine number mg KOH/g |
| NEUTR | neutralization: m-mole acid per 100 g resin solids |
| Vmax | rupture voltage, Volt |

All quantities in the table refer to resin solids even though solutions are obtained in the preparation of intermediates according to the conditions.

PREPARATION OF THE INTERMEDIATES

Preparation Of The N-Hydroxyalkyloxazolidines

N-2-hydroxyethyloxazolidine (HETOX): 105 g diethanolamine and 33 g of paraformaldehyde are blended and slowly heated to 120° C., using totuol as the solvent. When water formation is finished, the solvent is vacuum-stripped.

N-2-hydroxypropyl-5-methyol-oxazolidine (HIPOX): 133 g diisopropanolamine and 33 g of paraformaldehyde are reacted as described above.

Preparation Of The Oxazolidine Semiesters (OSE)

The N-2-hydroxyalkyloxazolidine-dicarboxylic acid semiesters are prepared according to Table 1. The reaction is carried on until the theoretical acid value of the semiester is attained, i.e., until the acid value remains constant.

TABLE 1

| | A 1 | A 2 | A 3 | A 4 | A 4a | A 5 | A 6 |
|---|---|---|---|---|---|---|---|
| THPA | 152 | — | — | 152 | 152 | 152 | — |
| PA | — | 148 | — | — | — | — | 148 |
| MA | — | — | 98 | — | — | — | — |
| HETOX | 117 | 117 | 117 | — | — | 117 | — |
| HIPOX | — | — | — | 145 | 145 | — | 145 |
| MIBK | — | 103 | — | — | 127 | — | — |
| AEGLAC | 115 | — | 82 | — | — | 67 | — |
| Xylol | — | — | — | 127 | — | — | 67 |
| React. Temp. °C. | 70 | 70 | 55 | 80 | 75 | 70 | 60 |

Preparation Of The Basic Semiesters (BSE)

S 7: 152 g of tetrahydrophthalic anhydride and 117 g of diethylaminoethanol are dissolved in 115 g of AEGLAC and held at 70° C., until the acid value remains constant.

S 8: 152 g of tetrahydrophthalic anhydride and 173 g of dibutylaminoethanol are dissolved in 139 g of MIBK and held at 70° C., until the acid value remains constant.

EXAMPLES 1–13

Reaction Of Oxazolidine Semiesters With Epoxy Compounds, And Modifications Thereof With Monocarboxylic Acids The oxazolidine semiester and epoxy compound, and optionally the monocarboxylic acid, are dissolved in AEGLAC to obtain a 70% solids solution. The batch is heated to 75° C. and held at this temperature, until the acid value has fallen below 3 mg KOH/g. The batch is then diluted to 60% solids with ethyleneglycolmonoethylether, as shown in Table 2.

TABLE 2

| | EPH | | OSE (70%) | | MCA | | | Amine Number |
|---|---|---|---|---|---|---|---|---|
| Example | Quantity | Type | Quantity | Type | Quantity | Type | DBN | mg KOH/g |
| 1 | 400 | I | 768 | A 1 | — | — | — | 119 |
| 2 | 300 | I | 576 | A 1 | 36 | S 2 | 0.5 | 83 |
|   | 275 | II | | | | | | |
| 3 | 400 | I | 384 | A 1 | 282 | S 3 | 1.1 | 59 |
| 4 | 1100 | II | 849 | A 4 | — | — | — | 66 |
| 5 | 200 | I | 307 | A 3 | 86 | S 1 | 1.4 | 80 |
|   | 200 | III | | | | | | |
| 6 | 400 | I | 961 | A 1 | 423 | S 3 | 0.6 | 54 |
|   | 1100 | II | | | | | | |
| 7 | 400 | I | 1537 | A 1 | — | — | — | 87 |
|   | 1100 | II | | | | | | |

TABLE 2-continued

| Example | EPH Quantity | Type | OSE (70%) Quantity | Type | MCA Quantity | Type | DBN | Amine Number mg KOH/g |
|---|---|---|---|---|---|---|---|---|
| 8 | 700 | III | 1136 | A 2 | 52 | S 1 | 0.4 | 109 |
| 9 | 400 | I | 961 | A 1 | 423 | S 3 | 0.8 | 74 |
|   | 400 | III |     |     |     |     |     |    |
| 10 | 700 | III | 1529 | A 4 | — | — | — | 114 |
| 11 | 350 | III | 849 | A 4 | 54 | S 2 | 0.5 | 72 |
|    | 550 | II |     |     |     |     |     |    |
| 12 | 700 | I | 769 | A 1 | 129 | S 1 | 1.1 | 82 |
| 13 | 700 | I | 1143 | A 1 | 564 | S 3 | 0.8 | 71 |
|    | 300 | III |     |     |     |     |     |    |

The binders are evaluated by determining the hardness and water resistance of a coating of clear varnish on a degreased untreated steel panel. For the salt spray test, the degreased untreated steel panels were coated with a pigmented paint (100 parts resin solids, 16 parts aluminium silicate pigment, 2 parts carbon black, 2 parts lead silicate) at optimum voltage conditions providing a dry film of 16–20 μm thickness; backing schedule 30 minutes at 160° C.

Water resistance was established by a water soak at 40° C. After 380 hours, the coatings show no visible effect, neither corrosion nor blistering. The films of Examples 3, 7, 10, 12, and 13 are slightly swollen, which means that the moist film can be scratched.

The salt spray test was conducted according to ASTM B 117–64. After 340 hours, all coatings show corrosion at the cross incision of less than 2 mm (Scotch tape tear-off).

The stoving losses were determined on a clear varnish coating cured at 100° C. until the weight remains constant (the resulting weight is taken on the basis of 100%). The difference in weight is then determined with a film after normal cure.

The conditions for neutralization, deposition, and curing as well as hardness and stoving losses are listed in Table 3.

TABLE 3

| Ex. | Neutralization (1) | Deposition (2) | (3) | (4) | Curing Temp. °C.(5) | Hardness (6) | Stoving Loss |
|---|---|---|---|---|---|---|---|
| 1 | 45 | AS | >300 | 200 | 140 | 170 | 2.7% |
| 2 | 40 | AS | 280 | 200 | 160 | 180 | 3.2% |
| 3 | 35 | AS | >300 | 200 | 160 | 180 | 4.1% |
| 4 | 35 | ES | >300 | 200 | 140 | 180 | 1.9% |
| 5 | 40 | ES | 250 | 180 | 160 | 140 | 2.2% |
| 6 | 35 | AS | 280 | 200 | 160 | 170 | 2.8% |
| 7 | 45 | AS | 270 | 180 | 140 | 150 | 2.4% |
| 8 | 40 | ES | 210 | 150 | 180 | 200 | 5.3% |
| 9 | 40 | AS | 260 | 180 | 180 | 200 | 6.9% |
| 10 | 45 | AS | 220 | 150 | 140 | 180 | 3.3% |
| 11 | 40 | ES | >300 | 200 | 160 | 180 | 3.8% |
| 12 | 40 | ES | >300 | 200 | 160 | 170 | 4.1% |
| 13 | 35 | AS | 270 | 200 | 160 | 170 | 4.3% |

Key to Table 3
(1) in m-mole per 100 g resin solids
(2) type of acid
(3) rupture voltage (Volt)
(4) deposition voltage (Volt)
(5) stoving time: 30 minutes
(6) seconds, DIN 53 157

EXAMPLES 14–25

The components listed in Table 1 are diluted with EGL to a solids content of 65% and heated to 75° to 80° C., until an acid value of less than 5 mg KOH/g is reached. The results obtained when using the mixed semiesters are the same as those with separate preparations.

The preparation of the mixed semiesters is carried out in order that hydroxyalkyloxazolidine, hydroxylkyl(-meth)acrylate, and dicarboxylic acid anhydride, optionally in the presence of inert solvents, such as esters, ketones or aromatic hydrocarbons, are heated to 70° to 80° C. until the acid value remains constant.

TABLE 4

| Ex | EPH (g) |   | OSE (g) |   | AMINE (g) | MCA (g) |   | DBN | AN | NEUTR | pH | Vmax |
|---|---|---|---|---|---|---|---|---|---|---|---|---|
| 14 | 650 | III |   |   |   |   |   |   |   |   |   |   |
|    | 1000 | II | 807 | A 5 | 66 DEAPA | 451 | S 3 | 0.54 | 75.3 | 35 ES | 7.0 | 300 |
| 15 | 250 | II |   |   | 80 DEAPA | 667 | S 5 |   |   |   |   |   |
|    | 1300 | III | 742 | A4a | 73 DEA | 168 | S 6 | 0.73 | 80 | 25 AS | 7.0 | 300 |
| 16 | 500 | II |   |   | 66 DEAPA |   |   |   |   |   |   |   |
|    | 650 | III | 498 | A 6 | 39 DBA | 451 | S 3 | 0.73 | 76.2 | 30 AS | 6.1 | 300 |
| 17 |   |   |   |   | 51 DMAPA |   |   |   |   |   |   |   |
|    | 1300 | III | 891 | A4a | 73 DEA | 620 | S 3 | 0.75 | 95.4 | 35 AS | 7.0 | 300 |
| 18 | 650 | III |   |   | 93 DEAPA |   |   |   |   |   |   |   |
|    | 1000 | II | 891 | A4a | 88 DEA | — | — | — | 115 | 35 AS | 7.6 |   |
|    |     |    |     |     |          |   |   |   |   |   |   | 250 |
| 19 | 650 | III |   |   | 36 BA |   |   |   |   |   |   |   |
|    | 1000 | II | 1040 | A4a | 58 DEA | 224 | S 6 | — | 98.7 | 70 ES | 6.3 | 100 |
| 20 |     |    |     |     | 66 DEAPA | 508 | S 3 |   |   |   |   |   |
|    | 1300 | III | 942 | A 5 | 36 DEA | 112 | S 6 | 0.61 | 95 | 35 AS | 6.8 | 240 |
| 21 | 200 | I |   |   |   |   |   |   |   |   |   |   |
|    | 500 | II | 968 | A 5 | 26 DBA | — | — | — | 105 | 30 AS | 5.9 | 200 |
|    | 325 | III |   |   |   |   |   |   |   |   |   |   |
| 22 | 500 | II |   |   | 31 DMAPA | 560 | S 4 |   |   |   |   |   |

TABLE 4-continued

| Ex | EPH (g) | | OSE (g) | AMINE (g) | MCA (g) | | DBN | AN | NEUTR | pH | Vmax |
|---|---|---|---|---|---|---|---|---|---|---|---|
|  | 1300 | III | 1277 | A4a 15 DEA | 72 | S 2 | 0.83 | 76 | 20 ES | 6.1 | 250 |
| 23 | 500 | II |  |  | 377 | S 3 |  |  |  |  |  |
|  | 650 | III | 624 | A4a 36 DEA | 168 | S 1 | 0.59 | 62 | 45 AS | 6.2 | 150 |
| 24 | 325 | III |  | 40 DEAPA |  |  |  |  |  |  |  |
|  | 500 | II | 416 | A4a 39 DBA | 141 | S 3 | 0.34 | 88 | 30 AS | 7.1 | 280 |
| 25 | 165 | III |  |  |  |  |  |  |  |  |  |
|  | 1000 | II | 356 | A4a 26 DBA | 423 | S 3 | 0.76 | 40 | 25 AS | 5.9 | 250 |

The evaluation of the products obtained according to Table 4 was carried out under the conditions designated for Examples 1-13. Water resistance was established through water soak at 40° C. After 380 hours the coatings show no visible effect, neither corrosion nor blistering. The salt spray test was conducted according to ASTM B 117-64. All coatings show corrosion after 340 hours, at the cross incision of less than 2 mm (Scotch tape tear-off).

EXAMPLES 26-36

The components listed in Table 5 are diluted with AEGL to a solids content of 65% and heated to 75 to 80%, until an acid value of below 5 mg KOH/g is reached. When using mixed semiesters the results are the same as obtained with separate preparations. The preparation of the mixed semiesters was carried out in order that hydroxyalkyloxazolidine, hydroxyalkyl(-meth)acrylate, tertiary amine alcohol, and dicarboxylic acid anhydride, optionally in the presence of inert solvents such as esters, ketones, or aromatic hydrocarbons, are heated to 70° to 80° C. until the acid value remains constant.

aforesaid description. Such modifications being within the ability of one skilled in the art form a part of the presen invention and are embraced by the appended claims.

It is claimed:

1. Binders water-dilutable upon partial or total neutralization with inorganic and/or organic acids, comprising the reaction product obtained by heating an epoxy resin having at least 2 1,2-epoxy groups per molecule and an epoxy equivalent of at least 160 with a semiester of an aliphatic, cycloaliphatic, or aromatic dicarboxylic acid and an N-2-hydroxyalkyloxazolidine having the general formula—

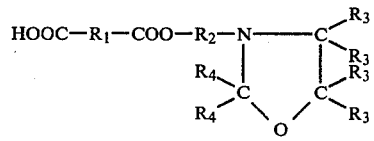

wherein $R_1$ is a saturated or unsaturated aliphatic, cycloali-

TABLE 5

| Ex | EPC (g) | | OSE (g) | | BSE (g) | | MCA (g) | | DCA (g) | | DBN | AN | NEUTR | pH | Vmax Volt |
|---|---|---|---|---|---|---|---|---|---|---|---|---|---|---|---|
| 26 | 1000 | II | 484 | A 5 | 161 | S 7 | 43 | S 2 | 103 | S 9 | 0.65 | 49 | 25 AS | 6.8 | 240 |
|  | 650 | III |  |  |  |  | 322 | S 4 |  |  |  |  |  |  |  |
| 27 | 200 | I | 538 | A 5 | 54 | S 7 | 106 | S 5 | 146 | S 9 | 0.24 | 73 | 30 AS | 6.5 | 300 |
|  | 650 | III |  |  |  |  |  |  |  |  |  |  |  |  |  |
| 28 | 1300 | III | 879 | A 6 | 195 | S 8 | 72 | S 2 | 118 | S11 | 0.59 | 74 | 30 ES | 6.9 | 280 |
|  |  |  |  |  |  |  | 168 | S 5 |  |  |  |  |  |  |  |
| 29 | 650 | III | 1040 | A4a | 135 | S 7 | 72 | S 2 | 50 | S10 | 0.64 | 72 | 35 AS | 6.5 | 250 |
|  | 400 | I |  |  |  |  | 268 | S 4 |  |  |  |  |  |  |  |
|  | 500 | II |  |  |  |  |  |  |  |  |  |  |  |  |  |
| 30 | 1300 | III | 1319 | A 6 | 538 | S 7 | 94 | S 2 | 29 | S 9 | 0.34 | 96 | 45 ES | 6.4 | 300 |
|  | 500 | II |  |  |  |  |  |  |  |  |  |  |  |  |  |
| 31 | 400 | I | 807 | A 6 | 81 | S 7 | 22 | S 2 | 33 | S11 | 0.13 | 72 | 30 ES | 6.4 | 200 |
|  | 1000 | II |  |  |  |  |  |  |  |  |  |  |  |  |  |
| 32 | 1300 | III | 1960 | A4a | 325 | S 8 | 451 | S 3 | 59 | S11 | 0.3 | 80 | 35 AS | 6.6 | 250 |
|  | 1000 | II |  |  |  |  |  |  |  |  |  |  |  |  |  |
|  | 200 | I |  |  |  |  |  |  |  |  |  |  |  |  |  |
| 33 | 1000 | II | 1211 | A 5 | 296 | S 7 | — | — | — | — | — | 99 | 35 AS | 6.7 | 200 |
|  | 650 | III |  |  |  |  |  |  |  |  |  |  |  |  |  |
| 34 | 800 | I | 672 | A 5 | 134 | S 7 | 72 | S 2 | — | — | 0.62 | 52 | 35 ES | 6.4 | 230 |
|  | 1000 | II |  |  |  |  | 268 | S 4 |  |  |  |  |  |  |  |
|  |  |  |  |  |  |  | 280 | S 6 |  |  |  |  |  |  |  |
| 35 | 400 | I | 1157 | A 5 | 65 | S 8 | — | — | 80 | S 9 | — | 107 | 25 ES | 6.5 | 280 |
|  | 650 | III |  |  |  |  |  |  |  |  |  |  |  |  |  |
| 36 | 1300 | III | 1188 | A4a | 377 | S 7 | — | — | 131 | S 9 | — | 101 | 35 ES | 6.4 | 260 |

Evaluation of the products according to Table 5 is carried out analogous to the evaluation of Examples 1-13. Water resistance was tested through water soak at 40° C. After 380 hours the coatings showed no visible effect, neither corrosion nor blistering. The salt spray test was conducted according to ASTM B 117-64. All coatings show corrosion after 340 hours, at the cross incision of less than 2 mm (Scotch tape tear-off).

As will be apparent to one skilled in the art, various modifications can be made within the scope of the phatic, or aromatic hydrocarbon radical, $R_2$ is a straight chain or branched alkylene radical, $R_3$ is a hydrogen atom or an alkyl radical, and $R_4$ is a hydrogen atom or an alkyl radical with up to 6 carbon atoms, the quantity of oxazolidine semiester being chosen in order that the epoxy-free final product has a theoretical amine number of at least 35 mg KOH/g.

2. The binders of claim 1 wherein the N-2-hydroxyalkyloxazolidine is the reaction product of diethanolamine or diisopropanolamine and formaldehyde.

3. The binders of claim 1 wherein the reaction temperature for producing the reaction product is at from about 60° to 75° C.

4. The binders of claim 1 wherein the epoxy groups of the epoxy resin are partially reacted with saturated and/or unsaturated carboxylic acids in addition to the reaction with the oxazolidine semiesters.

5. The binders of claim 1 wherein the reaction product includes other components for introducing additional crosslinking functionality and/or functionality which will influence film formation and/or film surface.

6. The binders of claim 5 wherein from 30 to 99.5 mole percent of the epoxy groups are reacted with the oxazolidine semiester; from 0.5 to 70 mole percent with primary and/or secondary amine, and with any remaining epoxy groups being reacted with saturated and/or unsaturated carboxylic acids.

7. The binders of claim 6 wherein from 40 to 60 mole percent of the epoxy groups are reacted with the oxazolidine semiester.

8. The binders of claim 6 wherein the primary amines include tertiary amine functionality.

9. The binders of claim 6 wherein the reaction product utilizes primary monoamines in combination with secondary amines.

10. Coating compositions containing the binders of claim 1.

11. Process for producing binders water-dilutable upon partial or total neutralization with inorganic and/or organic acids, based on epoxy resin esters, characterized in that the epoxy groups of a resinlike compound with at least 2 1,2-epoxy groups per molecular and an epoxy equivalent of at least 160 are reacted completely at 60°-75° C., with a semiester of an aliphatic, cycloaliphatic, or aromatic dicarboxylic acid and an N-2-hydroxyalkyloxazolidine having the general formula—

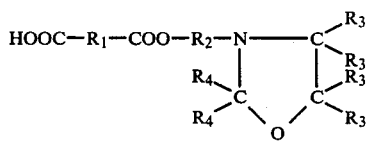

wherein
$R_1$ is a saturated or unsaturated aliphatic, cycloaliphatic, or aromatic hydrocarbon radical,
$R_2$ is a straight chain or branched alkylene radical,
$R_3$ is a hydrogen atom or an alkyl radical, and
$R_4$ is a hydrogen atom or an alkyl radical with up to 6 carbon atoms,
the quantity of oxazolidine semiester being chosen in order that the epoxy-free final product has a theoretical amine number of at least 35 mg KOH/g.

12. Process according to claim 11 further characterized in that the reaction charge includes additional compounds which introduce additional crosslinking functionality and/or functionality which influences film formation and/or film surface.

13. Process according to claim 11 further characterized in that the epoxy-free final product has a theoretical amine number of from about 50 to 140 mg KOH/g.

14. Process according to claim 11 further characterized in that the N-2-hydroxyalkyloxazolidine is a reaction product of diethanolamine or diisopropanolamine and formaldehyde.

15. Process according to claim 11 further characterized in that the epoxy groups are partially reacted with saturated and/or unsaturated carboxylic acids.

16. Process according to claim 11 further characterized in that from 30 to 99.5 mole percent of the epoxy groups are reacted with the oxazolidine semiester; from 0.5 to 70 mole percent with a primary or secondary amine, and any remaining epoxy groups are reacted with saturated and/or unsaturated carboxylic acids.

17. Process according to claim 16 further characterized in that 40–60 mole percent of the epoxy groups are reacted with the oxazolidine semiester.

18. Process according to claim 16 further characterized in that the primary amines include a tertiary amine functional group.

19. Process according to claim 16 further characterized in that primary monoamines are used in combination with secondary amines.

20. Process according to claim 16 further characterized in that the reaction of the epoxy compound with the oxazolidine semiester, the carboxylic acid, and the amine compound is effected simultaneously.

21. Process according to claim 16 further characterized in that the amine is reacted separately and subsequently.

22. Process according to claim 16 further characterized in that the epoxy groups are reacted with the amine, followed by a simultaneous reaction with a semiester intermediate of a dicarboxylic acid, an N-2-hydroxyalkyloxazolidine, and a hydroxyalkyl(meth)acrylate.

23. Process according to claim 11 further characterized in that from 30 to 99 mole percent of the epoxy groups are reacted with an oxazolidine semiester; from 1 to 30 mole percent with a semiester of a dicarboxylic acid and a tertiary amine alcohol, and the remaining epoxy groups are reacted with saturated and/or unsaturated mono- and/or dicarboxylic acids.

24. Process according to claim 23 further characterized in that as the esterifying component for the epoxy groups a combination of oxazolidine semiester, semiesters of dicarboxylic acids and tertiary amine alcohols, aliphatic, cycloaliphatic or aromatic dicarboxylic acids are employed.

* * * * *